Figure 1:
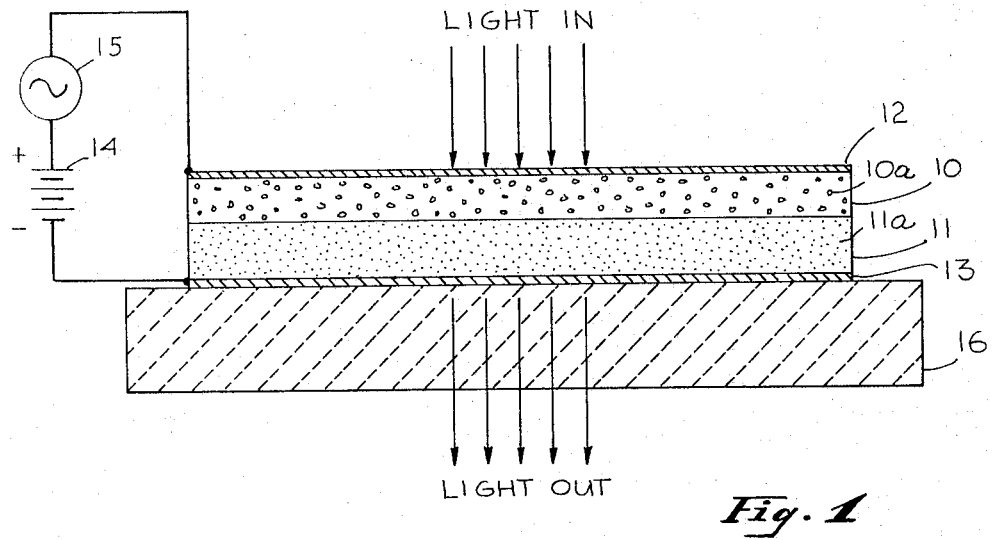

Jan. 24, 1967   J. S. WINSLOW   3,300,645
FERROELECTRIC IMAGE INTENSIFIER INCLUDING
INVERSE FEEDBACK MEANS
Filed Sept. 16, 1963

JOHN S. WINSLOW
INVENTOR.

BY Allen E. Botney
ATTORNEY

3,300,645
FERROELECTRIC IMAGE INTENSIFIER INCLUDING INVERSE FEEDBACK MEANS
John S. Winslow, Altadena, Calif., assignor to Electro-Optical Systems, Inc., Pasadena, Calif.
Filed Sept. 16, 1963, Ser. No. 309,080
9 Claims. (Cl. 250—213)

The present invention relates in general to light amplifiers and more particularly relates to a ferroelectric image intensifier device.

Because of its ability to intensify and store images as well as convert them from one wavelength to another, combined with its structural simplicity and compactness, the two-layer solid-state light amplifier stimulated considerable interest when first demonstrated a few years ago. Such amplifiers were developed to the point where, using visible light, they exhibited radiant energy gains of several hundred and were capable of producing output images of a quality exceeding that of commercial 500-line television pictures. When operated with X-ray input images, these intensifiers produced an output brightness 100 times greater than a conventional fluoroscope screen, at the same time greatly increasing the image contrast. However, devices of this type had a number of limitations, namely:

(1) Slow speed of response, which interfered with the viewing of moving objects;
(2) Limited resolution because of the photoconductor thickness, which was necessary in order to withstand the operating voltages;
(3) A relatively high input radiation threshold;
(4) An inherently high contrast ratio or gamma, thereby limiting its usefulness in some applications; and
(5) Restriction to the use of photoconductors with extremely high sensitivity and low dark current.

The above limitations resulted both because of the operating principles of such a two-layer device as well as the inherent properties of the materials utilized therein.

To a large degree, the limitations enumerated above were overcome by a new solid-state image intensifier approach as taught in the patent to Benjamin Kazan entitled, "Light Amplifying Device," Patent No. 2,905,830, issued September 22, 1959. In that approach, three layers were employed consisting, respectively, of a photoconductor, a ferroelectric material and an electroluminescent phosphor. By means of the added ferroelectric layer, the over-all operation compared to a two-layer photoconductive-electroluminescent amplifier was improved in many respects. Specifically, the ferroelectric amplifier approach allowed the fabrication of image intensifiers with the following advantages:

(1) Increased radiant energy gain;
(2) Increased speed of response;
(3) Increased output brightness;
(4) Decreased input radiation threshold;
(5) Made possible the use of photoconductors with increased dark current;
(6) Made possible the control of the input threshold;
(7) Made possible the control of the output image polarity;
(8) Made possible the control of contrast or gamma; and
(9) Made available the use of D.C. operated photoconductive layers.

However, notwithstanding the improvements mentioned, these earlier ferroelectric image intensifiers, as may be seen from the abovesaid patent to Kazan, all required complex electroding with one or more of the layers being broken into elements or lines. That situation was resolved by the invention taught in the co-pending U.S. patent application entitled "Image Intensifier," by Benjamin Kazan, Serial No. 456,901, filed May 12, 1965, which is a continuation-in-part of Serial No. 278,287 filed May 6, 1963, now abandoned. More specifically, in the co-pending application, the invention disclosed therein permits the construction of a ferroelectric image intensifier using only continuous layers of materials without, therefore, requiring an array of accurately spaced electrodes over the imaged area. As a result, the basic construction of such an image intensifier device is very greatly simplified, higher resolution is obtainable and improved uniformity can be expected.

The present invention, in two respects, improves upon the invention taught in the above-mentioned co-pending application Serial No. 278,287 by Benjamin Kazan. First, the presently proposed image intensifier is composed of two continuous layers, namely, a photoconductor layer and an electroluminescent phosphor layer, rather than three, thereby further simplifying the construction of such a device. Second, the transfer characteristic of prior devices of this kind is quite non-linear, the output light, in general, being proportional to the fifth power of the input light. The present invention introduces inverse feedback into these devices and, as a result thereof, their linearity is very greatly improved. As will be seen later when the invention is described in detail, the first improvement, namely, that of reducing the construction to two layers, is obtained by imbedding ferroelectric particles throughout the photoconductor layer. The second improvement, on the other hand, is realized by imbedding photoconductor particles throughout the electroluminescent phosphor layer.

It is, therefore, an object of the present invention to provide an improved two-layer solid-state amplifying device.

It is another object of the present invention to provide a solid-state image intensifier device in which only two continuous layers are used.

It is a further object of the present invention to provide a solid-state image intensifier device whose transfer characteristic is substantially linear.

It is an additional object of the present invention to provide an image intensifier device that combines high radiant power gain with improved linearity due to inverse feedback.

It is still another object of the present invention to provide an image intensifier device whose construction is relatively simple as compared to such prior art devices.

The novel features which are believed to be characteristic of the invention both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 2:
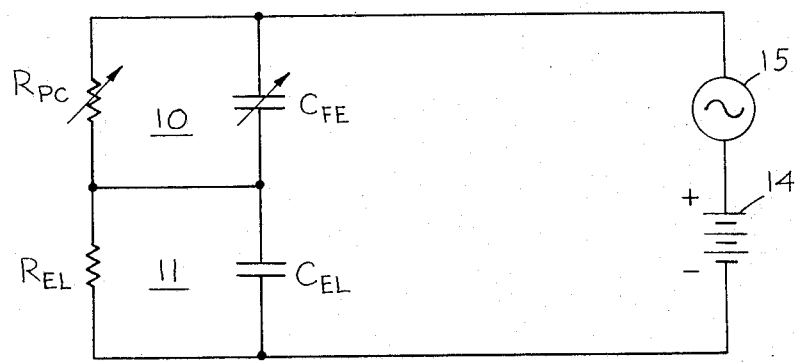

FIGURE 1 is a cross-sectional view of an embodiment constructed in accordance with the present invention; and FIGURE 2 is a schematic representation of equivalent circuit of an elemental picture element of an image intensifying device according to the present invention.

Considering now the drawing, reference is made in particular to FIG. 1 wherein an image intensifier in accordance with the present invention is shown to include a sandwich arrangement of a photoconductive layer 10 and an electroluminescent layer 11, one layer being deposited on top of the other in face-to-face relationship. Photoconductive layer 10 is preferably only several mils thick, for example three to four mils, and although photoconductive materials are well known, it may, by way of example, be made of a material such as cadmium sulphide or cadmium selenide and may be either in the powdered or solid form. As for electroluminescent layer 11, it is also only a few mils thick. Thus, layer 11 may be approximately 1 to 2 mils thick and may be any one of the known electroluminescent phosphors, such as copper activated zinc sulphide phosphor, and may be deposited by any of the known techniques such as settling or silk screening. Imbedded in photoconductive layer 10 and uniformly distributed throughout it are tiny particles of a ferroelectric material which are designated 10a. By way of example, these ferroelectric particles may be made of a material such as triglycine sulfate, Rochelle salt, barium titanate, barium strontium titanate, or the like. Similarly, conductive particles are imbedded in and uniformly distributed throughout the bottom layer, that is to say, the electroluminescent phosphor layer, the particles in this instance being designated 11a.

The free surfaces of photoconductive and electroluminescent layers 10 and 11, that is to say, the top and bottom surfaces of the above-described sandwich panel, are each covered with a transparent conducting layer, the one overlying the photoconductive layer being designated 12 and the other one, namely, the one overlying the electroluminescent layer, being designated 13. Transparent conducting layers 12 and 13 are film thin and may be of a material such as tin oxide or tin chloride and may be deposited by any known technique. These layers may also be made with thin films of metal, such as gold, evaporated onto their support surfaces by the process of vacuum deposition, the layers being thin enough to permit light to pass through them without difficulty.

Electrically connected between layers 12 and 13 are direct-current and alternating current voltage sources connected in series, the D.-C. source being designated 14 and the A.-C. source being designated 15. As an example of the voltages that may be involved, D.-C. source 14 is preferably in the neighborhood of 100 volts and A.-C. source 15 is preferably about 75 volts R.M.S. As shown in the figure, voltage source 14 is connected so that its negative terminal is connected to layer 13. As for voltage source 15, the frequency of its signal is preferably in the audio range and, as shown in the figure, it is connected between layer 12 and the positive terminal of voltage source 14.

Finally, also included in the FIG. 1 embodiment is a transparent support member or glass plate 16 that supports the entire layer assembly on one of its surfaces. More specifically, as is also shown in the figure, layers 10–13 rest on plate 16 so that conducting layer 13 is sandwiched in between layer 11 and plate 16. Transparent support member 16 may be made of a material such as Pyrex glass and may be approximately ¼ of an inch in thickness.

The underlying principle of the image intensifier device shown in FIG. 1 is presented in FIG. 2 by means of a schematic circuit which represents an elemental picture element in the intensifier. In other words, the schematic circuit in FIG. 2 sets forth the electrical circuit equivalents of an elemental portion or segment of layers 10 and 11 and the constituents thereof. Thus the equivalent of photoconductive layer 10 and the ferroelectric particles therein is the parallel combination of variable resistor $R_{PC}$ and variable capacitor $C_{FE}$ while the equivalent of electroluminescent layer 11 and the conductive particles therein is the parallel combination of fixed resistor $R_{EL}$ and fixed capacitor $C_{EL}$. These two parallel combinations, designated like the layers they represent, namely, 10 and 11, are connected in series between voltage sources 14 and 15 previously described. In considering the operation of this circuit, it will be assumed that the values of resistance are sufficiently high so that the alternating-current path is primarily through the capacitors. On the other hand, the D.-C. conductivity of the capacitors is assumed to be negligible, with the result that the direct-current path is primarily through the resistors. Stated otherwise, resistors $R_{EL}$ and $R_{PC}$ may be considered as forming a voltage divider with capacitors $C_{FE}$ and $C_{EL}$ respectively bridged across them.

Accordingly, in operation, the effect of radiation on the photoconductive element is to render it more conducting, which is the same as saying its resistance is reduced, that is to say, the resistance of resistor $R_{PC}$. As a result, the voltage drop across resistor $R_{PC}$ is reduced, the voltage across resistor $R_{EL}$ being correspondingly increased. This decrease in the D.-C. voltage across the ferroelectric portion of the photoconductive element increases its effective capacitance or, stated differently, it has the effect of increasing the capacitance of capacitor $C_{FE}$. This increase in capacitance, it will be recognized, correspondingly decreases the A.-C. impedance of the ferroelectric element, that is to say, the impedance of capacitor $C_{FE}$ in the equivalent circuit, so that the A.-C. current flow through the electroluminescent element is correspondingly increased. Consequently, there is an increase in the output light from the electroluminescent element. In other words, for the reasons given, the flow of A.-C. current through the electroluminescent phosphor layer is therefore increased and the light output also increased. This is brought about by the fact that the ferroelectric element has a square-shaped hysteresis loop. As a result, it acts, essentially, as an extremely non-linear A.-C. impedance, its blocking action toward the flow of A.-C. current decreasing rapidly with a decrease of field across it. Because of this, an increase of light on the photoconductive element, causing a decrease in field across the ferroelectric element, causes a sharp increase in the light emitted from the electroluminescent element.

Similarly, a reduction in input radiation will ultimately produce a decrease in output light. More particularly, a decrease in the amount of light on the photoconductive element causes it to become less conducting which, in FIG. 2, is represented by an increase in the resistance of resistor $R_{PC}$. It will thus be recognized that a lowering of the level of the incident radiation results in an increase in the voltage across the photoconductive element, that is to say, across resistor $R_{PC}$, the effect of which is to correspondingly reduce the capacitance of ferroelectric capacitor $C_{FE}$. This means an increase in the impedance of capacitor $C_{FE}$ in the equivalent circuit so that the A.-C. current flow through the electroluminescent element is correspondingly reduced, thereby reducing the light emitted from the electroluminescent element.

For the reasons presented, it is thus seen that a small change in input radiation on the photoconductor produces a large change in the output light.

As was previously mentioned, the equivalent circuit in FIG. 2 is taken for an elemental picture element in the FIG. 1 embodiment and, as will be recognized, any such embodiment would necessarily include a great many of these elemental picture elements. However, the principles underlying one such picture element are equally applicable to all picture elements. Moreover, since layers 10–13 are very thin, electrical current flows straight down through them and does not, to any practical extent, flow or spread sideways. Accordingly, it may be said that each elemental picture element is isolated from or acts independently from every other picture element, which means that the underlying principles of a single picture element are also valid for the embodiment as a whole. Thus, a light image passing through film 12 and impinging upon photoconductive layer 10 will result in an intensified output image visible through glass plate 16.

As was previously mentioned, the transfer characteristic of light-amplifying devices are, in general, quite non-linear, the output light being proportional to the 5th power of the input light. However, the transfer characteristic of the FIG. 1 embodiment can be modified to produce very greatly increased linearity by substituting photoconductive particles for the conductive particles imbedded in the electroluminescent phosphor. The result of doing so, briefly stated, is that as the phosphor becomes brighter in response to increasing input light, the D.-C. conductance of the phosphor layer increases, thereby increasing the D.-C. voltage drop across the ferroelectric. This action opposes that of the incident illumination so that inverse feedback is realized.

More specifically, with photoconductive particles substituted for conductive particles 11a, resistor $R_{EL}$ in FIG. 2 becomes a variable rather than a fixed resistor. Accordingly, an increase in the amount of light incident upon photoconductor layer 10 causes, as before, both the value of resistance of resistor $R_{PC}$ and the impedance of capacitor $C_{FE}$ to go down. When this occurs, the A.-C. current flow through electroluminescent layer 11 increases and so does its light output. This increase in brightness, however, renders the photoconductive particles imbedded in and throughout layer 11 somewhat more conducting which, in the equivalent circuit of FIG. 2, means that the resistance of resistor $R_{EL}$ is thereby reduced. Since resistors $R_{PC}$ and $R_{EL}$ form a voltage divider, as previously mentioned, any decrease in the resistance of resistor $R_{EL}$ and, therefore, the voltage thereacross, results in a corresponding increase in the voltage across resistor $R_{PC}$ as well as across ferroelectric capacitor $C_{FE}$. This tends to decrease the ferroelectric capacitance and, therefore, increase its impedance. Hence, for the reasons given, the change in the A.-C. current flow through electroluminescent layer 11 and, therefore, the change in the light output therefrom, is more restrained than it would be normally.

On the other hand, in the event of a decrease in the amount of light incident upon layer 10, the photoconductive particles have the similar effect of restraining the downward trend of the output light. Accordingly, it is thus seen that the photoconductive paricles produce an inverse feedback effect which greatly improves the transfer characteristic of the device in the sense that a more linear relationship now exists between the input and output.

Although a number of particular arrangements of the invention have been illustrated and described above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. In an image intensifier, apparatus comprising: continuous layers of a photoconductive material and of an electroluminescent material in a sandwich arrangement, said photoconductive layer including ferroelectric particles distributed therethroughout and said electroluminescent layer including inverse feedback means for linearizing the transfer characteristic of the image intensifier; and transparent conducting layers on the top and bottom surfaces, respectively, of said sandwich arrangement.

2. Image intensifier apparatus comprising: continuous layers, one upon the other, of a photoconductive material and an electroluminescent material, said photoconductive and electroluminescent layers respectively including ferroelectric and conductive particles distributed therethroughout; transparent conducting layers on the top and bottom surfaces of said layer combination; and direct-current and alternating-current voltage sources connected in series between said transparent layers.

3. Image intensifier apparatus comprising: continuous layers, one upon the other, of a photoconductive material and an electroluminescent material, said photoconductive and electroluminescent layers respectively including ferroelectric and photoconductive particles distributed therethroughout; transparent conducting layers on the top and bottom surfaces of said layer combination; and direct-current and alternating-current voltage sources connected in series between said transparent layers.

4. In an image intensifier, apparatus comprising: continuous layers of a photoconductive material and of an electroluminescent material in a sandwich arrangement, said photoconductive and electroluminescent layers respectively including ferroelectric and conductive particles distributed therethroughout; and transparent conducting layers on the top and bottom surfaces, respectively, of said sandwich arrangement.

5. In an image intensifier, apparatus comprising: continuous layers of a photoconductive material and of an electroluminescent material in a sandwich arrangement, said photoconductive and electroluminescent layers respectively including ferroelectric and photoconductive particles distributed therethroughout; and transparent conducting layers on the top and bottom surfaces, respectively, of said sandwich arrangement.

6. Image intensifier apparatus comprising: continuous layers of a photoconductive material and of an electroluminescent material in a sandwich arrangement, said photoconductive layer including ferroelectric particles distributed therethroughout and said electroluminescent layer including inverse feedback means for linearizing the transfer characteristic of the image intensifier; transparent conducting layers on the top and bottom surfaces, respectively, of said sandwich arrangement; a transparent supporting base on which said layers are mounted; and direct-current and alternating-current voltage sources connected in series between said transparent conducting layers, said alternating-current source producing a signal whose frequency is in the audio range.

7. Image intensifier apparatus to which direct-current and alternating-current voltage sources are connected for light amplifying purposes, said apparatus comprising: continuous layers of a photoconductive material and of an electroluminescent material in a sandwich arrangement; means in contact with said layers for applying the direct-current and alternating-current voltages therebetween, said means being of a nature that permits light to pass therethrough to said photoconductive layer; and ferroelectric particles uniformly distributed throughout said photoconductive layer.

8. The image intensifier apparatus defined in claim 7 wherein said apparatus further includes particles of a conductive material uniformly distributed throughout said electroluminescent layer.

9. Image intensifier apparatus to which direct-current and alternating-current voltage sources are connected for light-amplifying purposes, said apparatus comprising: continuous layers of a photoconductive material and of an electroluminescent material in a sandwich arrangement, said layer of electroluminescent material including particles of a photoconductive material uniformly distributed throughout it; means in contact with said layers for applying the direct-current and alternating-current voltages therebetween, said means being of a nature that permits light to pass therethrough to said photoconductive layer; and ferroelectric particles uniformly distributed throughout said photoconductive layer.

References Cited by the Examiner

UNITED STATES PATENTS

| 2,873,380 | 2/1959 | Kazan | 250—213 |
| 2,905,830 | 9/1959 | Kazan | 250—213 |
| 3,033,989 | 5/1962 | Kazan | 250—213 |
| 3,054,900 | 9/1962 | Orthuber | 250—213 |
| 3,112,404 | 11/1963 | Reed | 250—213 |

WALTER STOLWEIN, *Primary Examiner.*